May 13, 1958  P. BRADFORD  2,834,188
METHOD AND APPARATUS FOR ATMOSPHERIC CONDITIONING
Filed May 10, 1956  7 Sheets-Sheet 1

Fig. 1

INVENTOR.
PURDY BRADFORD
BY R. G. Story
ATTORNEY

May 13, 1958 P. BRADFORD 2,834,188
METHOD AND APPARATUS FOR ATMOSPHERIC CONDITIONING
Filed May 10, 1956 7 Sheets-Sheet 2

Fig. 2

INVENTOR.
PURDY BRADFORD
BY R. G. Stoy
ATTORNEY

May 13, 1958 P. BRADFORD 2,834,188
METHOD AND APPARATUS FOR ATMOSPHERIC CONDITIONING
Filed May 10, 1956 7 Sheets-Sheet 3

INVENTOR.
Purdy Bradford
BY
ATTORNEY

May 13, 1958     P. BRADFORD     2,834,188
METHOD AND APPARATUS FOR ATMOSPHERIC CONDITIONING
Filed May 10, 1956     7 Sheets-Sheet 4

INVENTOR.
Purdy Bradford
BY
R. G. Story
ATTORNEY

May 13, 1958 P. BRADFORD 2,834,188
METHOD AND APPARATUS FOR ATMOSPHERIC CONDITIONING
Filed May 10, 1956 7 Sheets-Sheet 5

INVENTOR.
PURDY BRADFORD
BY R. G. Story
ATTORNEY

United States Patent Office 2,834,188
Patented May 13, 1958

2,834,188

METHOD AND APPARATUS FOR ATMOSPHERIC CONDITIONING

Purdy Bradford, Palos Park, Ill., assignor to Swift & Company, Chicago, Ill., a corporation of Illinois Application May 10, 1956, Serial No. 584,140

14 Claims. (Cl. 62—6)

This invention relates to atmospheric conditioning and provides improved method and apparatus which permits close regulation of humidity and temperature. The system, while not limited thereto, is particularly adaptable to refrigeration of meats and other food stuffs. This is a continuation-in-part of my presently co-pending application, Serial No. 331,821, filed January 19, 1953.

In the meat-packing industry, shrinkage of meat in storage after slaughter and prior to shipment to the trade is a very serious problem. Shrinks in the neighborhood of 2 percent are not uncommon and result in large monetary losses. In addition, there are methods of meat processing which require quite close regulation of temperature and humidity; for example, chilling and storing meat without impairing color or bloom and aging of meat to enhance tenderness and flavor.

Heretofore, while control of temperature has been generally satisfactory, it has not been possible to control humidity within critical limits with conventional equipment. Through the use of the equipment and the practice of the methods of the present invention, I am able to effectively regulate humidity as well as temperature. The practice of the invention will substantially reduce meat shrinkage and facilitate the practice of other methods of meat processing.

In its broad aspects, the method of my invention comprises continuously removing air from a conditioned chamber to a conditioning unit where the air is pressurized, and its temperature and relative humidity regulated. The air is then expanded while simultaneously doing work and returned to the conditioned chamber. Steps are taken for regulating the conditioning unit to result in an atmosphere within the conditioned chamber of the desired relative humidity and temperature.

More particularly, in the preferred embodiment the air is compressed to such a pressure and the temperature is adjusted to such a value as to give, when returned to the conditioned chamber, a conditioned air of the desired relative humidity and desired temperature. The pressurized air is expanded through an appropriate air engine or turboexpander and recirculated through the conditioned chamber. By this method the air is required to do work removing energy therefrom and lowering its temperature.

The magnitude of the work performed by the compressed air is regulated solely in accordance with the temperature variations, that is, with a variation in the temperature from the desired temperature, the work performed is accordingly varied to obtain the desired temperature within the conditioned chamber. The temperature of the pressurized air is controlled in accordance with the relative humidity of the conditioned chamber air, that is to say, with a variation in the actual relative humidity of the chamber air from the desired relative humidity, the temperature of the pressurized air is accordingly altered to obtain the desired value.

A refrigerated brine may be employed to regulate both the temperature and adjust the humidity of the pressurized air. In an alternative, a closed refrigerated system is used to cool the air and water may be added separately for accomplishing the humidity adjustment. In another embodiment, I employ refrigerated brine in direct contact with the pressurized air followed by water spraying of the air before its expansion through the air engine. This latter scheme for regulating temperature and moisture content of the pressurized air results in a considerable power saving. It has been my experience with one installation that in using a 70° salometer brine (18.5% salt by weight) it is necessary in order to maintain a 95% relative humidity and 32° F. temperature in the conditioned room that the pressurized air have a temperature of about 38° F. and a pressure of 2.0 to 2.5 p. s. i. gauge. When the auxiliary water spray is incorporated in the system to contact the pressurized air with water following its scrubbing with the refrigerated brine, it is possible to carry more moisture in the pressurized air at a given temperature. With the use of this auxiliary water spray, I have found that the conditioned chamber may be held at the foregoing mentioned temperature and moisture content with the temperature of the conditioning unit at approximately 34° F. and a pressure differential of only 0.75 to 1.25 p. s. i. gauge. This arrangement permits an appreciable power saving.

As previously mentioned, the temperature of the air in the conditioned chamber is controlled by adjusting the work that the pressurized air performs. This may be done by controlling the work output of the air engine itself, by controlling the pressure differential across the air engine (normally this will be just controlling the pressure on the high pressure side of the air engine because the pressure on the opposite side will be atmospheric), by controlling the volume of air through the air engine, or by a combination of the foregoing means. In the preferred embodiment I use as a means of control of temperature the regulation of the pressure differential across the air engine; that is, the control of the pressure on the high pressure side of the air engine. However, even in these embodiments there is some regulation of the other factors.

The air conditioning system of my invention is made up of a refrigerated or conditioned chamber, a conditioning unit with means for transferring air from the chamber to the conditioning unit and means for returning the conditioned air from the unit to the chamber. Means are provided for pressurizing the air within the conditioning unit along with means for spraying and adjusting the temperature of the pressurized air. The system has provisions for varying the temperature of the pressurized air in accordance with the relative humidity of the air of the conditioned chamber. There are also means for enabling the pressurized air to do work in expanding to the pressure of the conditioned chamber and for controlling the amount of that work in accordance with variations in the temperature of the chamber air. As previously mentioned, I prefer to control the amount of that work by controlling the amount of pressure of the pressurized air with respect to atmospheric pressure, which is substantially what exists at the low pressure side of the means for doing work.

Specific embodiments of the apparatus of the present invention which may be used in carrying out the methods of the invention are illustrated in the accompanying drawings.

Figure 1:
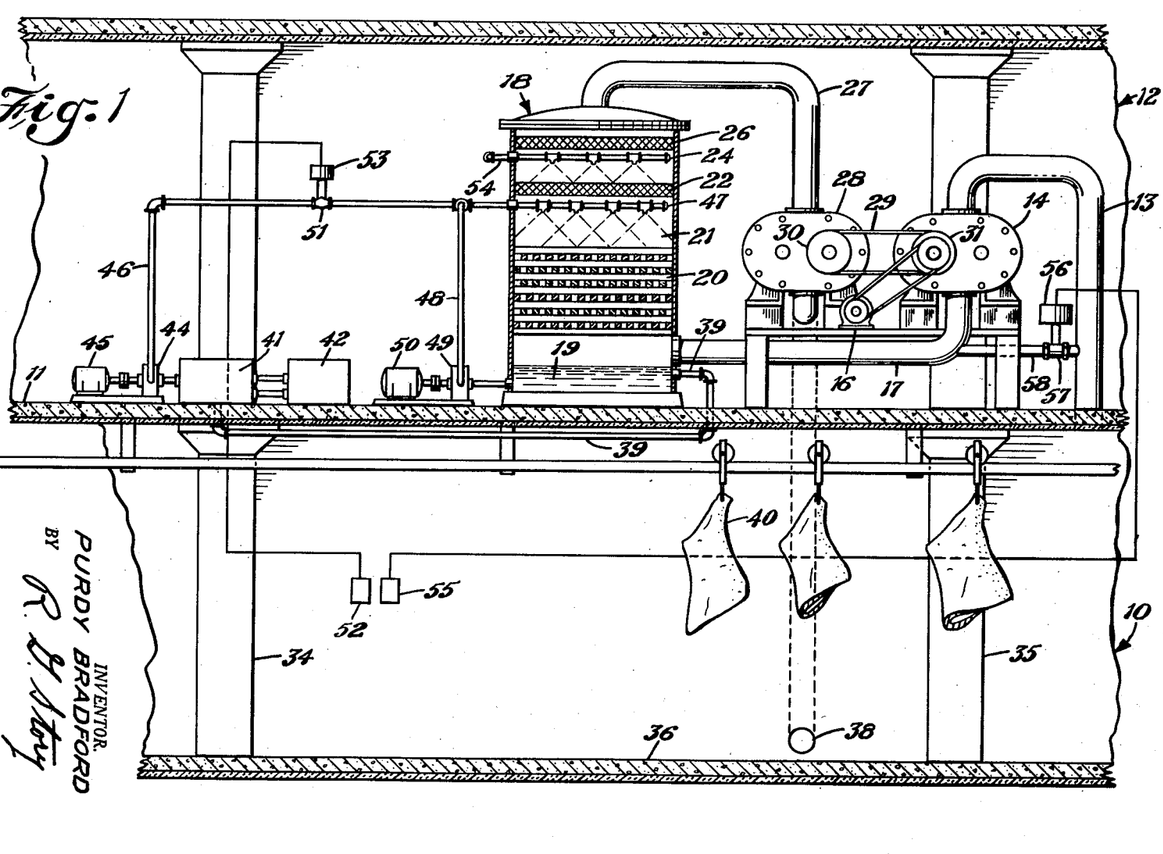
Figure 1 is an elevation, partly in cross section, of one embodiment of the apparatus of the invention illustrating a lower refrigerated room and a second compartment above the refrigerated room wherein the conditioning equipment is placed.
Figure 2:
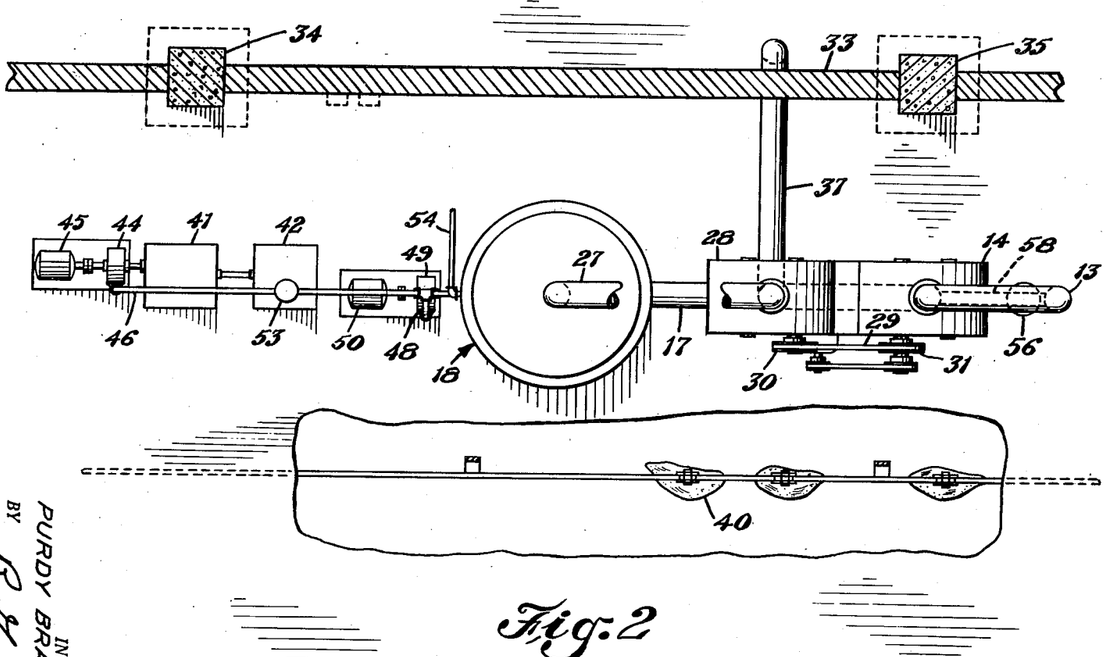
Figure 2 is a plan view of the equipment loft of Figure 1, with a portion of the floor which separates that compartment from the refrigerated room, being cut away.

With reference to Figures 1 and 2, the building illustrated has a lower refrigerated meat compartment or cooler 10 which is separated by an intermediate floor 11 from an overhead second compartment 12 which houses the atmospheric conditioning equipment used in air conditioning the lower compartment. Air from the atmosphere of the meat cooler is drawn through a duct 13 to the inlet of a positive displacement blower 14. The duct opens through the floor 11 into the meat cooler below. The blower is driven by an electric motor 16. Air under compression from the blower passes by way of a duct 17 to a cylindrical conditioning tower or unit 18. The duct opens into the tower at a point above a brine sump 19 and below a grid work 20 which fills the cross section of the tower. The compressed air passes upward through the grid work and a spray area 21 where it is contacted with downwardly flowing refrigerated brine, up through a brine eliminator 22 into a second spray area where it is scrubbed with water from the sprays of a manifold 24. Preferably, the second spray is a constant temperature spray. The air is substantially saturated by each of the two sprays. The compressed air, following the second spray, continues its passage upwardly through the conditioning tower to a second eliminator 26 which removes the water droplets. The compressed air passes from the top of the conditioning tower through a third duct 27 to an expander 28, which is an air engine resembling the input blower 14. The expander 28 is coupled by a belt 29 through suitable pulleys 30 and 31 to the drive shaft of the blower 14. This arrangement permits the recovery of a portion of the energy required for compressing the air.

As best seen in Figure 2, the lower refrigerated compartment has a back vertical wall 33 supported by two upright and spaced pillars 34 and 35. The two pillars continue upward through the floor which separates the two compartments but in the upper compartment the two pillars do not support a vertical wall as they do in the lower refrigerated area. The conditioned air, following passage through the expander 28, flows through a horizontally disposed conduit 37 in the upper compartment to a point behind the vertical wall of the lower compartment where the conduit bends downward in a 90-degree angle. From the sharp bend, the conduit passes through the floor 11 and continues downward to a point adjacent the floor 36 of the refrigerated compartment where it opens through the vertical wall 33 into the refrigerated space through an outlet 38.

A small diameter pipe 39 connects into the brine sump of the cylindrical tower and leads from there to a reservoir 41. The temperature of the returned brine is adjusted by the refrigerating unit 42. Following refrigeration, the brine is drawn through a pump 44 driven by a motor 45 and pumped under pressure through a return pipe 46 to a manifold 47 which is disposed in the cylindrical conditioning tower above the grid work and below the brine eliminator. The brine is sprayed downward through the several nozzles of the manifold. A portion of the spent brine is returned, without refrigeration, to the manifold through a pipe 48 and pump 49 which is driven by a motor 50. Water for the second spray manifold 24 is supplied through a pipe 54.

The grid work 20 is composed of thirteen alternately directed layers of closely spaced 2" x 2" members which each extend the width of the tower. The members of each layer are spaced about 2" apart. The grid assures intimate contacting of the brine and air. The brine eliminator 22 and water eliminator 26 may be of conventional construction, such as a multilayer woven wire mesh structure with a thickness of about 4 inches.

There is a drop in pressure across the expander 28 during the course of which the air does work therein resulting in the lowering of the temperature of the conditioned air. Depending upon the moisture content and the temperature of the pressurized air, and the pressure differential of the system, moisture may be released from the expanded air so as to form a colloidal suspension of minute ice particles. On other occasions there will, upon expansion, be simply an increase in relative humidity with no condensation, or the excess moisture may be carried as super-saturated vapor. At other times, depending upon the operating conditions, there may be condensation of moisture to form a fog. The term "relative humidity" as used herein is used to include such situations where percentage moisture content is in excess of 100% and should not be construed as covering only those percentage humidities below 100%.

As the temperature of the conditioned air is raised by the absorption of heat from the cooler walls and the product (carcass meat 40 in Figures 1 and 2) stored in the cooler, there will likely be an evaporation of the ice fog that may be present or of any separated moisture. It will be noted that the relative humidity and the temperature of the circulating air will vary somewhat throughout the system, e. g., air upon being discharged from the conditioning unit will likely have a very high relative humidity and a relatively low temperature immediately following expansion, whereas air within the cooler in the vicinity of the stored product will have a somewhat higher temperature and a lower relative humidity.

There is a valve 51 disposed in the refrigerated brine return line 46 which permits regulation of the amount of refrigerated brine passed to the manifold 47. A partial closing of the valve 51 will increase the ratio of recirculated, unrefrigerated brine to the recirculated, refrigerated brine, thus increasing the temperature of the air within the conditioning unit. Since the air with the partial closing of this valve, will have a relatively higher temperature than before the closing of the valve, it is capable of carrying more moisture than formerly, thereby increasing the relative humidity of the conditioned air within the refrigerated space 10. The humidity is regulated with the assistance of a humidity sensing instrument 52 and a humidity controller 53 which may be electrically linked together. The humidity controller is coupled to the brine valve 51 to regulate the opening and closing of the valve. The controller may be set to any desired relative humidity within its range. In operation, if there should be a variance in the recording of the humidity sensing instrument and the setting of the controller, the controller will cause the valve to be moved in the appropriate direction to remedy the variance. For example, if there should be a drop in the relative humidity recorded by the sensing instrument below the setting of the controller, the controller will move the valve toward its closed position thus decreasing the ratio of refrigerated brine to unrefrigerated brine, thereby raising the temperature of the air within the conditioning unit, and thereby causing the air to carry more moisture than formerly. This will result in an increase in the relative humidity or moisture content of the conditioned air within the meat cooler. If there is no different between the setting of the humidity controller and the recording of the humidity sensing instrument, the brine valve is undisturbed.

The temperature of the air within the refrigerated space 10 is governed by regulating the degree of pressurization of the air within the conditioning tower 18. When there occurs a difference in the temperature of the air of the refrigerated or conditioned space from the desired temperature, the pressure differential (i. e. the differential existing between the tower pressure and the atmospheric pressure in the cooler 10) is accordingly varied to obtain the desired temperature. The temperature of the cooler is regulated with the aid of a temperature sensing instrument 55 which is linked to a temperature controller 56. The temperature controller 56 controls the setting of a valve 57 in a by-pass line 58 connecting ducts 13 and 17.

If there should be a variance in the temperature setting of the controller from the actual temperature of the refrigerated space as registered on the sensing instrument, a signal is sent from the instrument to the controller which results in the opening or closing of the valve 57 to obtain the proper pressure differential and thus the desired temperature within the cooler. Obviously, valve 57 will vary the volume of air from compressor 14 delivered to engine 28 which will affect the work output of the air in engine 28, but this is a minor effect and the major effect is in the change in pressure across engine 28. As an example, if there should be a drop in the temperature of the sensing instrument below the setting of the controller, the controller will activate the valve 57 toward its open position, thus resulting in a smaller pressure differential, and hence, an increase in the temperature of the cooler.

The use of the auxiliary water spray 24 to saturate the pressurized air following the brine spraying of the air permits increasing the moisture load of the pressurized air even though there has been no increase in temperature. The moisture content of air in equilibrium with brine is less than the moisture content of air at the same temperature and pressure in equilibrium with water; for example, the vapor pressure of water in air in equilibrium with 20% brine at 35.6° F. is 4.46 mm. Hg and the vapor pressure of water in air in equilibrium with water is 5.26 mm. Hg. As mentioned before, the result of incorporating such auxiliary water spray in the system is to realize an appreciable power saving.

The previously described system is capable of removing as well as adding moisture to the air undergoing conditioning. If a product within the conditioned space gives up moisture to the air, this may result in raising the relative humidity above that desired. In that event the humidity sensing instrument will send a signal to the humidity controller which will move the brine valve toward its open position and increase the amount of refrigerated brine in relation to the unrefrigerated brine. The cooler brine spray will lower the temperature of the air within the conditioning unit. In this instance, the air would give up moisture to the brine in reaching an equilibrium. Since the conditioned air returned to the cooler has a lower moisture content than the air leaving the cooler, and because the temperature of the cooler remains the same, the relative humidity will drop to the desired operating humidity. There will be periods when moisture will not be transferred to or removed from the air undergoing conditioning.

Figure 3:
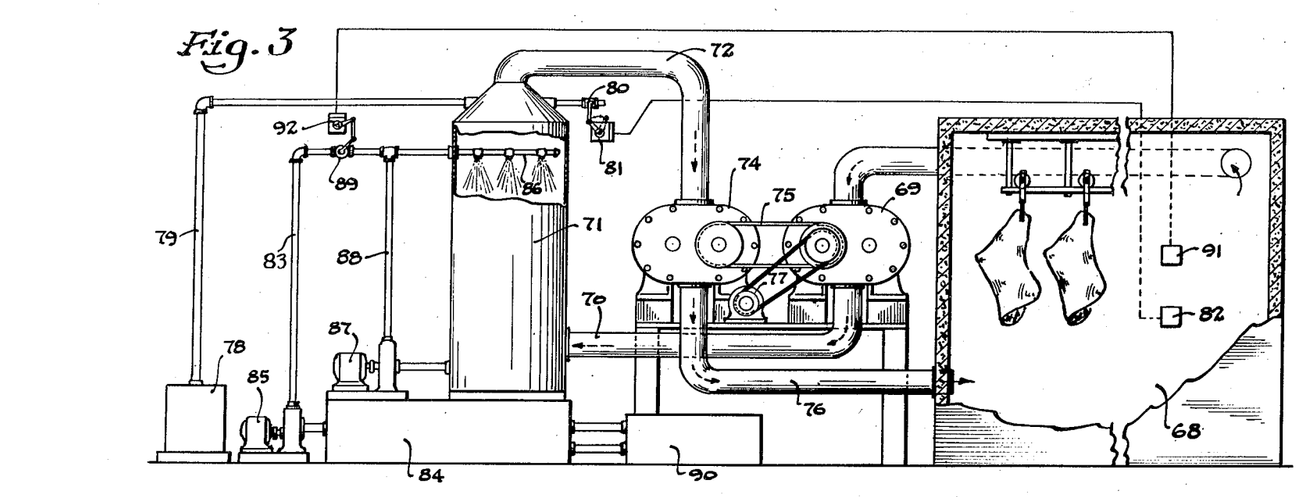
Figure 3 is an elevation, partly in cross section, of a second embodiment of the invention, utilizing two positive displacement air blowers, so coupled as to permit recovery of a portion of the energy input of the system.
Figure 4:
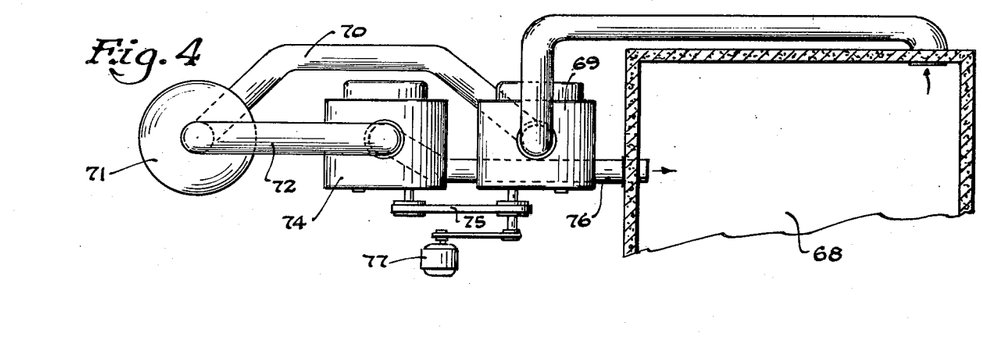
Figure 4 is a plan view, partially cut away, of the embodiment of Figure 3.

In the embodiment of Figures 3 and 4, air is withdrawn from a cooler 68 by a positive displacement blower 69 and forced through a duct 70 into a cylindrical and substantially air tight conditioning unit 71. The air introduced at the base of the unit rises through a brine spray and exits from the top of the unit through a duct 72 which is connected to a second positive air blower 74. The second blower serves as an air engine across which the pressure differential is obtained and the air expanded to the lower refrigeration temperature. Air expands through the engine and is returned to the cooler through a duct 76.

The input blower 69 is driven by an electric motor 77 and by the air engine 74 which is coupled through a V-belt 75 and the necessary pulleys to the input blower.

An air pipe 79 connected to an air compressor 78 opens into the conical top of the cylindrical conditioning unit near the exit. Air flows continuously through this pipe under pressure into the system. By this means, it is possible to increase the pressure range over which the unit may operate, thereby broadening the temperature range of the air discharged from the expander 74. A pressure control bleeder valve 80 which governs the pressure within the conditioning unit is mounted on the conical top. The valve in its open position permits air to escape to the atmosphere and is mechanically linked, as illustrated, to a temperature controller 81 which may be electrically or pneumatically connected to a temperature-sensing instrument 82 placed within the cooler. If there should be a variance in the temperature setting of the controller and the temperature of the cooler as registered on the sensing instrument, a signal is sent from the instrument to the controller which causes an electric motor of the controller to be energized. (In an alternative, air pressure may be employed to operate the valve 81.) The motor moves the linkage in the proper direction, thereby either opening or closing the pressure control valve to obtain the proper pressure differential and thus the desired temperature within the cooler.

The cooling brine portion of the system generally resembles that described for Figure 1. Cooling brine is pumped from a brine tank 84 by a pump 85 through a pipe 83 to a spray head 86 within the conditioning unit where the brine is sprayed downward through several openings of the head into the air passing through the conditioning unit. The air is saturated by the spray. The spent brine is collected in the bottom of the unit from which it is removed by gravity flow to the brine tank 84. The brine collected in the tank is cooled by a refrigeration machine 90. As illustrated, a portion of the brine is returned directly to the spray head without refrigeration by a pump 87 through a recirculated brine line 88 which empties into the pipe 83 before the spray manifold and after a refrigerated brine control valve 89.

The opening of the brine control valve increases the ratio of the refrigerated brine to the unrefrigerated (recirculated) brine, thus lowering the temperature of the air within the conditioning unit. A relatively low temperature air, it will be recalled, carries less moisture than air having a higher temperature. This being so, the relative humidity of the conditioned air within the cooler drops with an opening of the valve 89. As explained in the description of Figure 1, the humidity within the cooler is governed through opening and closing of this brine valve in response to signals from a humidity-sensing instrument 91 to a humidity controller 92, both of which operate in the manner described.

Figure 5:
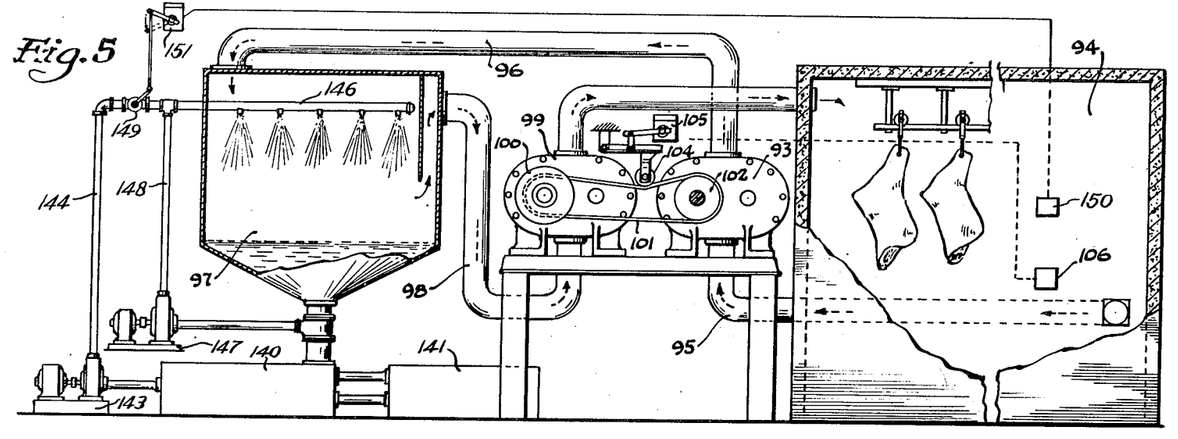
Figure 5 is an elevation, again partially in cross section, of a third embodiment of the invention, with an arrangement somewhat similar to that of Figure 3 for recovering a portion of the energy input of the system and a different scheme for regulating the work output of the pressurized air.
Figure 6:
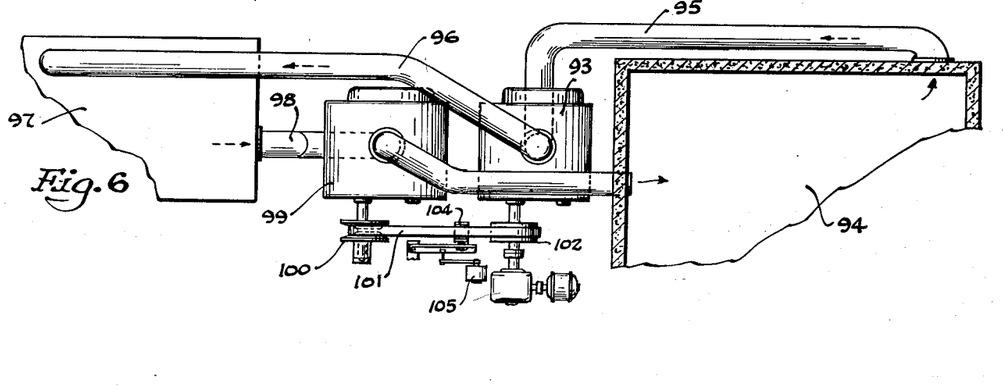
Figure 6 is a plan view, partially cut away, of the apparatus of Figure 5.

The apparatus of Figures 5 and 6 illustrates another means for achieving the temperature of the air in the refrigerated chamber as a function of the work output of the air engine. In this case control is maintained directly over the work output of the air engine as distinguished from controlling the pressure across the air engine directly. The cooling brine portion of the system is like that of the system illustrated in Figure 3.

A positive displacement air blower 93 withdraws air through a duct 95 from a cooler 94 and delivers it by a duct 96 to a conditioning unit 97. The humidity of the air passing through the conditioning unit is adjusted as described before. A positive displacement blower 99 thereby lessening the amount of air that is returned to the low pressure side of the blower.

The amount of moisture carried by a volume of air is dependent upon the temperature of that air. This principle is used in regulating the relative humidity within the cooler. If the relative humidity within the cooler is less than that desired, the temperature of air within the conditioning unit must be increased to permit the air to carry a larger load of water. This is accomplished by increasing the ratio of recirculated (unrefrigerated) brine to fresh (refrigerated) brine.

The index of a relative humidity controller 166 (located at the cooler) is manually set to the desired relative humidity to be maintained in the cooler. This controller has as its sensing unit a hygrometer cell 167. If there should be a difference in the recording of the hygrometer cell and the manual setting of the controller, a signal is transmitted to a temperature controller 168. The signal may be transmitted pneumatically or electrically. The transmitted signal from the relative humidity controller positions the control index of the temperature controller. The temperature controller has as its sensing element a temperature bulb (or thermocouple) 170, placed at the outlet of the conditioning unit in the embodiment illustrated in Figure 8. If desired, the bulb could be located within the conditioning unit itself. When there is a variance between the temperature of this bulb 170 and the setting of the control index of the temperature controller, a brine valve 172 is moved by a motor 171 in the appropriate direction to vary the ratio of the fresh and recirculated brine to give a conditioned air of the desired temperature at the bulb 170. Brine from the sump of the conditioning unit is cooled in a refrigeration machine 173 and returned under the pressure of a pump 174 through the valve to the sprays of the conditioning unit. A portion of the brine is returned without refrigeration by a pump 175.

Figure 8:
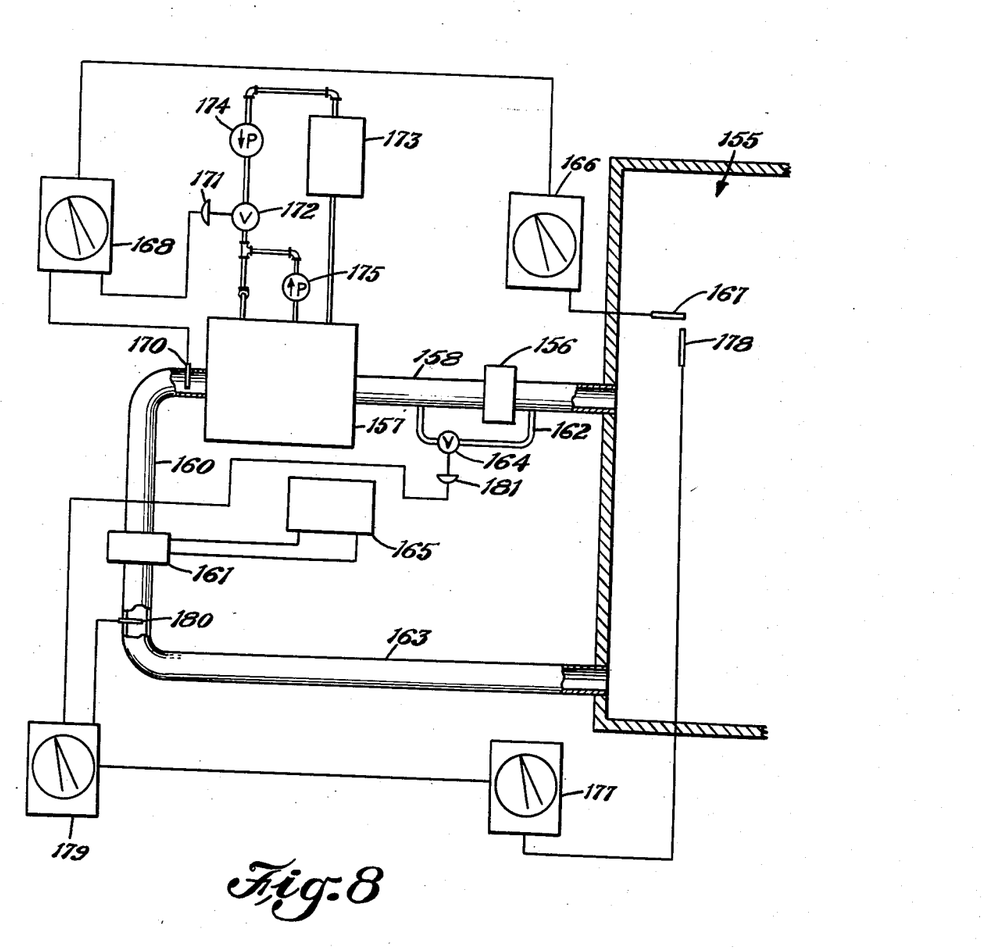
Figure 8 is a schematic view of an instrumentation arrangement which may be employed in a modified or unmodified form in the several systems of Figures 1–7 inclusive.

A temperature controller 177, placed at the cooler, has as its sensing element a temperature bulb 178. If there is a variance between the manual setting of the temperature controller and the recording of the bulb, a signal is sent to a second temperature controller 179 to position the control index of the second temperature controller. This second temperature controller has as its sensing element a temperature bulb 180 immediately downstream from the turbogenerator 161. If there should be a variation between the setting of the control index of the controller 179 and the recording of its temperature bulb 180, a signal is sent to a motor 181 which is coupled to the valve 164 of the by-pass duct 162. For instance, if the recording of the temperature bulb 180 is lower than the setting of the control index of controller 179 the by-pass valve will be opened thereby lowering the pressure of the conditioning chamber and increasing the temperature of the expanded air from the turbogenerator.

In the operation of the embodiment illustrated in Figures 1 and 2, air is withdrawn from the refrigeration chamber and forced by a blower into a conditioning tower. In pressurizing the air there necessarily occurs an increase in temperature. The heat load is removed at this higher temperature level by spraying the pressurized air within the conditioning unit with a cooling brine. The cooling brine also serves to adjust the moisture content of the air. The air from the conditioning unit does work in passing through an expander air engine with the result that energy is extracted, causing a substantial drop in temperature of the air. In the particular embodiment of Figures 1 and 2 there is an auxiliary water spray for raising the moisture content of the pressurized air following adjustment of this temperature with brine. The provision of the auxiliary spray has resulted in a considerable power saving.

The systems of Figures 3 and 5 differ principally from the embodiment of the Figure 1 and each other in the manners employed for controlling the pressure of the conditioning unit. In Figure 5 means are provided for varying the speed of the air engine to give the necessary pressure differential between the conditioning unit and the cooler and thereby maintain the desired cooler temperature. In the system of Figure 3 the required variations in the pressure differential are obtained through operation of a bleeder valve which governs the pressure of the conditioning unit.

Figure 7:
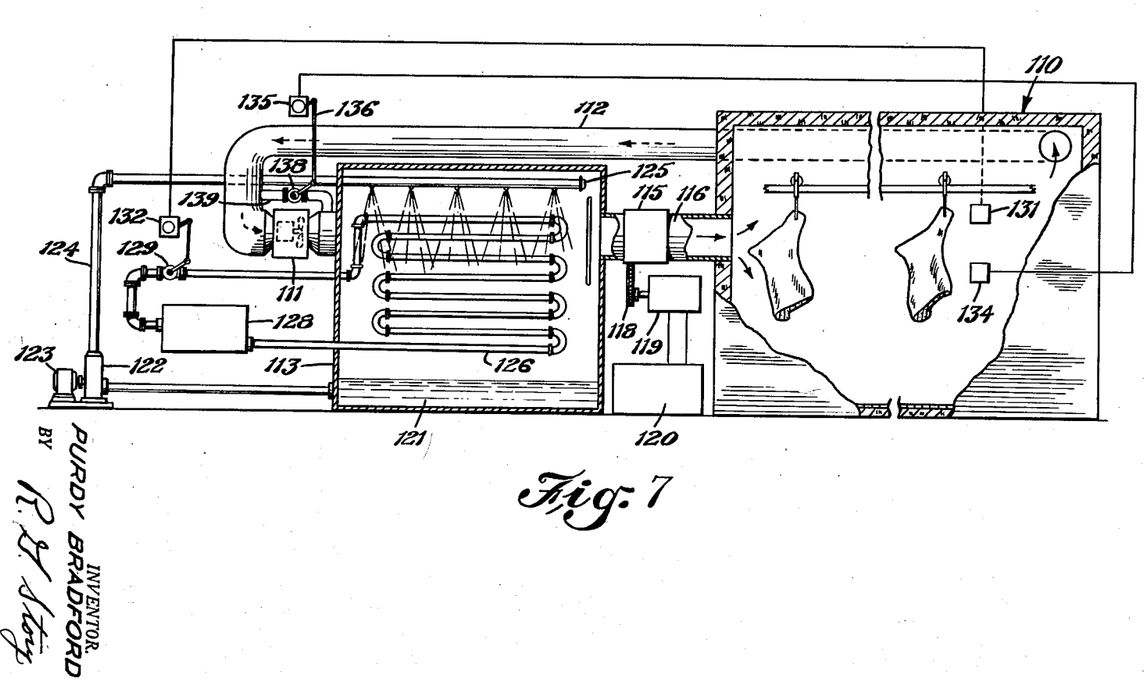
Figure 7 is an elevation, again with a portion in cross section, of still another embodiment of the apparatus of the invention, which employs a closed refrigerant system, with some of the elements being shown diagrammatically.

The system of Figure 7 differs from the other illustrated embodiments of my invention in that a closed refrigeration system is used to cool the air in the conditioning unit. The moisture content of the air is adjusted by a recirculated brine or water spray. Temperature regulation is accomplished, as in the other apparatus, through a suitable scheme for varying the amount of pressurization in the conditioning unit.

The instrumentation of Figure 8 may be employed, if necessary, with the systems of the other figures to lessen objectionable "hunting."

Figure 9:
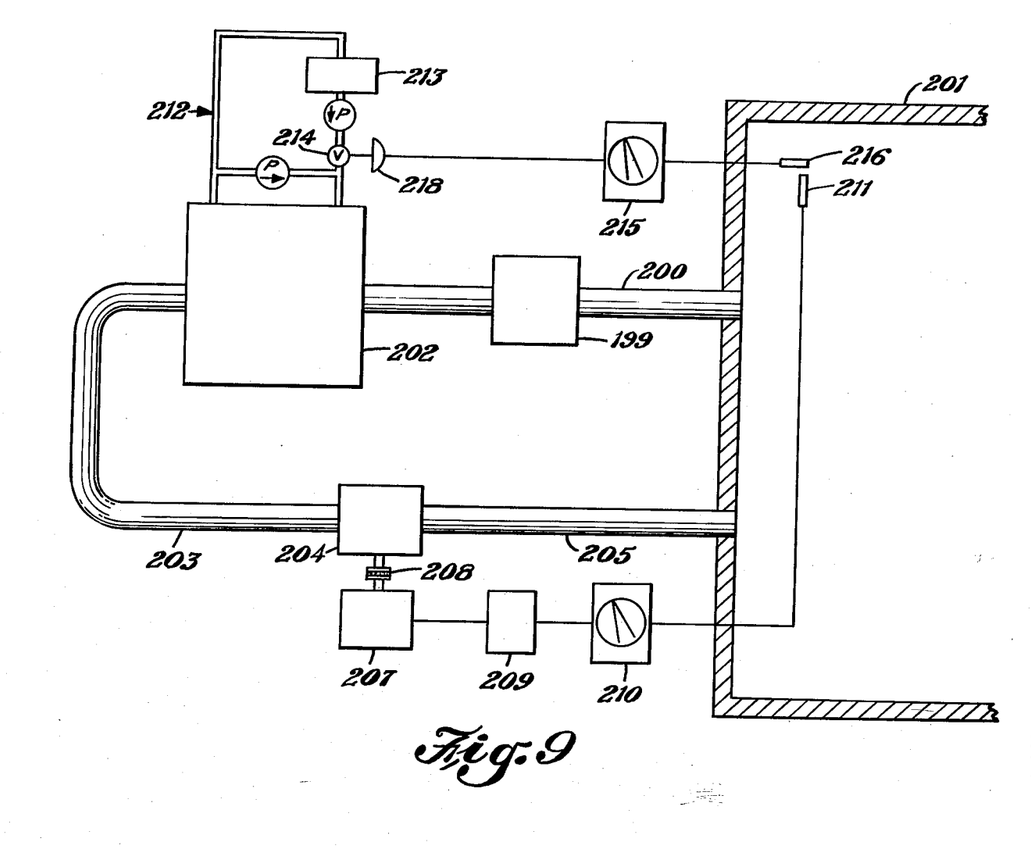
Figure 9 is a schematic illustration of a further modification.

Referring to Figure 9, this figure illustrates a further alternative means and method for controlling the energy extracted from the pressurized air and thus controlling the temperature of the air within the refrigerated chamber. In this embodiment a duct 200 passes between a chamber 201 to be refrigerated and a conditioning unit 202. Within duct 200 is an air compressor 199. The air from the conditioning unit passes through a duct 203, an air motor 204, and a duct 205 leading back to chamber 201. Air motor 204 drives a generator 207 by means of a coupling 208 interconnecting the shafts of the two. Generator 207 is connected to a suitable electric load or sink 209, which load may be altered in response to a signal from a temperature controller 210 to which it is connected. The temperature controller has as its sensing element a temperature bulb 211. The controller is set at a temperature within its range and any variation from this setting will cause a signal. Load 209 may comprise electric motors, variable resistances, or other suitable means for controllably absorbing the electrical energy. These are connected to the temperature controller 210 in such a manner that when the temperature at the bulb 211 goes above the desired setting an increased consumption of electrical energy will occur, and when the ambient temperature in chamber 201 goes below the setting of the temperature controller 210 a lesser amount of electrical energy will be absorbed by sink 209. The spray means generally 212 includes a suitable refrigeration unit 213 and a valve 214 controlled by a humidity controller 215 through a motor 213. The controller is connected to a suitable humidity responsive element 216 corresponding in structure and operation to the humidity controlling means described in previous embodiments herein. The embodiment of Figure 9 is intended to illustrate an alternative form of temperature control for the conditioned chamber with the humidity control of one of the previous embodiments being used therewith.

In the embodiment of Figure 9, the air is compressed by a compressor 199 and delivered to conditioning unit 202. After the temperature of the air is adjusted in the conditioning unit 202 and the air therein is sprayed, the air passes through duct 203 to air motor 204. In this embodiment, as in the others disclosed, the spray substantially saturates the compressed air. The moisture content of the compressed air will therefore be directly related to the temperature of that air; that is to say, an increase in the temperature of the air will cause the air to carry more moisture. The amount of energy extracted from the air is controlled by the sink 209 fed by generator 207. If the refrigeration demand is high a substantial amount of energy is absorbed into sink 209 putting a corresponding load on air motor 204. This load will have some effect in slowing down the passage of air and increasing the back pressure in duct 203. When the ambient temperature in chamber 201 approaches or goes below thereby lessening the amount of air that is returned to the low pressure side of the blower.

The amount of moisture carried by a volume of air is dependent upon the temperature of that air. This principle is used in regulating the relative humidity within the cooler. If the relative humidity within the cooler is less than that desired, the temperature of air within the conditioning unit must be increased to permit the air to carry a larger load of water. This is accomplished by increasing the ratio of recirculated (unrefrigerated) brine to fresh (refrigerated) brine.

The index of a relative humidity controller 166 (located at the cooler) is manually set to the desired relative humidity to be maintained in the cooler. This controller has as its sensing unit a hygrometer cell 167. If there should be a difference in the recording of the hygrometer cell and the manual setting of the controller, a signal is transmitted to a temperature controller 168. The signal may be transmitted pneumatically or electrically. The transmitted signal from the relative humidity controller positions the control index of the temperature controller. The temperature controller has as its sensing element a temperature bulb (or thermocouple) 170, placed at the outlet of the conditioning unit in the embodiment illustrated in Figure 8. If desired, the bulb could be located within the conditioning unit itself. When there is a variance between the temperature of this bulb 170 and the setting of the control index of the temperature controller, a brine valve 172 is moved by a motor 171 in the appropriate direction to vary the ratio of the fresh and recirculated brine to give a conditioned air of the desired temperature at the bulb 170. Brine from the sump of the conditioning unit is cooled in a refrigeration machine 173 and returned under the pressure of a pump 174 through the valve to the sprays of the conditioning unit. A portion of the brine is returned without refrigeration by a pump 175.

A temperature controller 177, placed at the cooler, has as its sensing element a temperature bulb 178. If there is a variance between the manual setting of the temperature controller and the recording of the bulb, a signal is sent to a second temperature controller 179 to position the control index of the second temperature controller. This second temperature controller has as its sensing element a temperature bulb 180 immediately downstream from the turbogenerator 161. If there should be a variation between the setting of the control index of the controller 179 and the recording of its temperature bulb 180, a signal is sent to a motor 181 which is coupled to the valve 164 of the by-pass duct 162. For instance, if the recording of the temperature bulb 180 is lower than the setting of the control index of controller 179 the by-pass valve will be opened thereby lowering the pressure of the conditioning chamber and increasing the temperature of the expanded air from the turbogenerator.

In the operation of the embodiment illustrated in Figures 1 and 2, air is withdrawn from the refrigeration chamber and forced by a blower into a conditioning tower. In pressurizing the air there necessarily occurs an increase in temperature. The heat load is removed at this higher temperature level by spraying the pressurized air within the conditioning unit with a cooling brine. The cooling brine also serves to adjust the moisture content of the air. The air from the conditioning unit does work in passing through an expander air engine with the result that energy is extracted, causing a substantial drop in temperature of the air. In the particular embodiment of Figures 1 and 2 there is an auxiliary water spray for raising the moisture content of the pressurized air following adjustment of this temperature with brine. The provision of the auxiliary spray has resulted in a considerable power saving.

The systems of Figures 3 and 5 differ principally from the embodiment of the Figure 1 and each other in the manners employed for controlling the pressure of the conditioning unit. In Figure 5 means are provided for varying the speed of the air engine to give the necessary pressure differential between the conditioning unit and the cooler and thereby maintain the desired cooler temperature. In the system of Figure 3 the required variations in the pressure differential are obtained through operation of a bleeder valve which governs the pressure of the conditioning unit.

The system of Figure 7 differs from the other illustrated embodiments of my invention in that a closed refrigeration system is used to cool the air in the conditioning unit. The moisture content of the air is adjusted by a recirculated brine or water spray. Temperature regulation is accomplished, as in the other apparatus, through a suitable scheme for varying the amount of pressurization in the conditioning unit.

The instrumentation of Figure 8 may be employed, if necessary, with the systems of the other figures to lessen objectionable "hunting."

Referring to Figure 9, this figure illustrates a further alternative means and method for controlling the energy extracted from the pressurized air and thus controlling the temperature of the air within the refrigerated chamber. In this embodiment a duct 200 passes between a chamber 201 to be refrigerated and a conditioning unit 202. Within duct 200 is an air compressor 199. The air from the conditioning unit passes through a duct 203, an air motor 204, and a duct 205 leading back to chamber 201. Air motor 204 drives a generator 207 by means of a coupling 208 interconnecting the shafts of the two. Generator 207 is connected to a suitable electric load or sink 209, which load may be altered in response to a signal from a temperature controller 210 to which it is connected. The temperature controller has as its sensing element a temperature bulb 211. The controller is set at a temperature within its range and any variation from this setting will cause a signal. Load 209 may comprise electric motors, variable resistances, or other suitable means for controllably absorbing the electrical energy. These are connected to the temperature controller 210 in such a manner that when the temperature at the bulb 211 goes above the desired setting an increased consumption of electrical energy will occur, and when the ambient temperature in chamber 201 goes below the setting of the temperature controller 210 a lesser amount of electrical energy will be absorbed by sink 209. The spray means generally 212 includes a suitable refrigeration unit 213 and a valve 214 controlled by a humidity controller 215 through a motor 218. The controller is connected to a suitable humidity responsive element 216 corresponding in structure and operation to the humidity controlling means described in previous embodiments herein. The embodiment of Figure 9 is intended to illustrate an alternative form of temperature control for the conditioned chamber with the humidity control of one of the previous embodiments being used therewith.

In the embodiment of Figure 9, the air is compressed by a compressor 199 and delivered to conditioning unit 202. After the temperature of the air is adjusted in the conditioning unit 202 and the air therein is sprayed, the air passes through duct 203 to air motor 204. In this embodiment, as in the others disclosed, the spray substantially saturates the compressed air. The moisture content of the compressed air will therefore be directly related to the temperature of that air; that is to say, an increase in the temperature of the air will cause the air to carry more moisture. The amount of energy extracted from the air is controlled by the sink 209 fed by generator 207. If the refrigeration demand is high a substantial amount of energy is absorbed into sink 209 putting a corresponding load on air motor 204. This load will have some effect in slowing down the passage of air and increasing the back pressure in duct 203. When the ambient temperature in chamber 201 approaches or goes below the temperature requirements as indicated by the setting of controller 210, less load is put on generator 207 by the load adjusting means 209. Correspondingly, a lesser load is applied to air motor 204 and the air through duct 205 is refrigerated less than previously.

Obviously, many modifications and variations of the invention as hereinbefore set forth may be made without departing from the spirit and scope thereof, and therefore only such limitations should be imposed as are indicated in the appended claims.

I claim:

1. In an air conditioning apparatus for a chamber, the combination comprising: a conditioning unit, a first air duct for removing air from the chamber to the unit, a second air duct for returning air from the unit to the chamber, means for pressurizing the air within the unit, a means for controlling the pressure differential between the unit and the chamber as a function of the temperature of the chamber, means for spraying and varying the temperature of the air within the unit, means for controlling the temperature of the air within the conditioning unit as a function of the relative humidity of the chamber, and means for enabling the pressurized air to do work in expanding.

2. In an air conditioning apparatus for a chamber to obtain a desired relative humidity and desired temperature, the combination comprising: a conditioning unit; a first air duct for removing air from the chamber to the unit; a second air duct for returning air from the unit to the chamber; means for pressurizing the air within the unit to such a pressure that upon expansion to chamber pressure there results a conditioned air of the desired temperature within the chamber, said means including a blower within the first duct, an air engine in the second airduct and means for regulating the pressure within the unit as a function of the temperature of the chamber; and means for cooling and adjusting the moisture content of the pressurized air to such a moisture content that upon expansion to the pressure of the chamber there results a conditioned air of the desired relative humidity, said means for cooling and adjusting the moisture content including means for spraying the pressurized air within the unit, and means for varying the temperature of the air within the unit to give an air of the necessary moisture content.

3. An air conditioning system comprising a chamber, a conditioning unit, means for transferring air from the chamber to the conditioning unit, means for returning conditioned air from the conditioning unit to the chamber, means for pressurizing the air within the conditioning unit, means for spraying and adjusting the temperature of the pressurized air, means for varying the degree of pressurization within said unit solely in accordance with the temperature of the chamber air, means for varying the temperature of the pressurized air in accordance with the relative humidity of the air of the chamber, and means for enabling the pressurized air to do work in expanding to the pressure of the chamber.

4. An air conditioning system comprising a chamber, a conditioning unit, means for transferring air from the chamber to the conditioning unit, means for returning conditioned air from the conditioning unit to the chamber, means for pressurizing the air within the conditioning unit, means for spraying and adjusting the temperature of the pressurized air, means for varying the temperature of the pressurized air in accordance with the relative humidity of the air of the chamber, means for enabling the pressurized air to do work in expanding to the pressure of the chamber, and means for controlling the amount of work of said last mentioned means solely in accordance with the temperature in said chamber.

5. A method of conditioning the atmosphere of a chamber to obtain a desired relative humidity and a desired temperature, the steps comprising removing the air from the chamber, compressing and adjusting the temperature of the compressed air in the presence of a spray, regulating the pressure differential solely in accordance with the temperature of the chamber, controlling the temperature of the pressurized air solely in accordance with the relative humidity of the air of the chamber, expanding the pressurized air and simultaneously doing work in the expansion of the air, and introducing the expanded air to the chamber.

6. In a method of refrigeration of a chamber to obtain a desired temperature and a desired relative humidity within the chamber, the steps comprising: continuously removing the air of the chamber; simultaneously pressurizing and cooling and adjusting the moisture content of the removed air to a pressure and temperature and a moisture level which upon expansion of the air to the chamber pressure results in a conditioned air of the desired temperature and the desired relative humidity within the chamber; regulating the degree of pressurizing solely in accordance with the temperature of the chamber atmosphere, regulating the temperature of the pressurized air solely in accordance with the relative humidity of the chamber atmosphere to obtain a pressurized air with the necessary moisture load to give the desired relative humidity upon expansion; expanding the pressurized air while doing work; and circulating the air through the chamber.

7. In a method of conditioning the atmosphere of a chamber to obtain a desired relative humidity and a desired temperature, the steps comprising removing air from the chamber, compressing and adjusting the temperature of the air to such values in the presence of a spray that upon expansion of the compressed air to the pressure of the chamber there results a conditioned air of the desired temperature and of the relative humidity within the chamber, regulating the degree of pressurizing solely in response to variations in the temperature of the chamber air, controlling the temperature of the pressurized air solely in response to variations in the relative humidity of the chamber air, and thereafter expanding the pressurized air while simultaneously doing work during expansion to the pressure of the chamber.

8. A method of controlling the relative humidity and temperature of a refrigeration chamber which comprises continuously removing the air of the chamber, pressurizing the air to a pressure above the pressure of the chamber, the pressure differential being varied solely in accordance with the temperature of the chamber air so that upon expansion of the air to chamber pressure the expanded air will have substantially the desired temperature, cooling the pressurized air to a temperature which upon spraying will give a substantially saturated air having the necessary moisture content to provide the desired relative humidity within the chamber, spraying the pressurized air, the temperature of the pressurized air being regulated solely in accordance with the relative humidity of the chamber air, expanding the pressurized air and utilizing the expanding air to do work, and thereafter reintroducing the air to the chamber.

9. A method of controlling the relative humidity and temperature of a chamber which comprises: continuously removing the air of the chamber, pressurizing the air, cooling the pressurized air to a temperature which upon spraying will give an air having the necessary moisture content to provide an atmosphere of the desired relative humidity within the chamber, controlling the temperature of the pressurized air solely in accordance with the relative humidity of the chamber, spraying the pressurized air, expanding the pressurized air through an air engine, thereby recovering a portion of the power input required to compress the air, rotating said engine at a speed to give a pressure differential of such magnitude between the pressure of the pressurized air and the pressure of the chamber that upon expansion of the air to chamber pressure the expanded air will have substantially the desired temperature, regulating the speed of said engine solely as a function of the temperature of the chamber, and thereafter reintroducing the air to the chamber.

10. A method of conditioning the atmosphere of a chamber to obtain a desired relative humidity and a desired temperature, the steps comprising continuously removing air from the chamber, pressurizing the air in the presence of a brine spray, the temperature of the brine spray being regulated to give a pressurized air having a moisture content which upon expansion to the pressure of the chamber results in a conditioned air of the desired relative humidity, said pressurizing being of a magnitude to give upon expansion a conditioned air of the desired temperature within the chamber, regulating the magnitude of pressurizing solely as a function of the temperature of the chamber atmosphere, regulating the temperature of the brine spray as a function of the relative humidity of the chamber atmosphere, expanding the pressurized air and simultaneously doing work in the expansion of the air, and introducing the expanded air to the chamber.

11. A method of air conditioning substantially as described in claim 10, wherein following spraying of the pressurized air with brine, said pressurized air is subjected to further spraying with water to increase its moisture content.

12. A method of conditioning the atmosphere of a chamber to obtain a desired relative humidity and a desired temperature, the steps comprising continuously removing air from the chamber, pressurizing the air in the presence of a brine spray, collecting the brine after spraying the pressurized air and dividing said spray into a first and a second portion; recirculating the first portion without refrigeration, refrigerating and recirculating the second portion, proportioning the first portion and the second portion of the recirculated brine to form a brine spray having a temperature which will adjust the temperature of the pressurized air to result in a pressurized air having a moisture load which upon expansion to the pressure of the chamber gives a conditioned air of the desired relative humidity, said pressurizing being of a magnitude to give upon expansion a conditioned air of the desired temperature within the chamber, regulating the magnitude of pressurizing solely as a function of the temperature of the chamber atmosphere, regulating the ratio of the two portions of the recirculated brine as a function of the relative humidity of the chamber atmosphere, doing work with pressurized air while expanding it, and introducing the conditioned air to the chamber.

13. A method of conditioning the atmosphere of a chamber to obtain a desired relative humidity and temperature, including the steps of removing air from the chamber, compressing said removed air, adjusting the temperature of the compressed air, spraying said compressed air, extracting energy from said compressed air and returning it to said chamber, controlling the amount of energy extracted solely in accordance with the ambient temperature in said chamber, and controlling the temperature of said compressed air in accordance with the ambient humidity in said chamber.

14. A method of conditioning the atmosphere of a chamber to obtain a desired relative humidity and desired temperature, including the steps of removing air from the chamber, compressing said removed air, adjusting the temperature of the compressed air, spraying said compressed air to substantially saturate it, extracting energy from said compressed air and returning it to said chamber, controlling the degree of pressurizing solely in accordance with the ambient temperature in said chamber, and controlling the temperature of said compressed air in accordance with the ambient humidity in said chamber.

References Cited in the file of this patent

UNITED STATES PATENTS

| | | |
|---|---|---|
| 2,126,266 | Laird | Aug. 9, 1938 |
| 2,304,151 | Crawford | Dec. 8, 1942 |